United States Patent [19]

Killian

[11] 4,125,956

[45] Nov. 21, 1978

[54] DIP NET FOR FISH AND THE LIKE

[75] Inventor: Henry E. Killian, Anniston, Ala.

[73] Assignee: Whale Enterprises, Inc., Piedmont, Ala.

[21] Appl. No.: 767,563

[22] Filed: Feb. 10, 1977

[51] Int. Cl.² ............................................. A01K 77/00
[52] U.S. Cl. .......................................................... 43/11
[58] Field of Search ............................................ 43/11

[56] References Cited

U.S. PATENT DOCUMENTS

| 2,604,715 | 7/1952 | Brown, Jr. | 43/11 |
| 2,783,573 | 3/1957 | Rau | 43/11 |

*Primary Examiner*—Louis G. Mancene
*Assistant Examiner*—Daniel J. Leach
*Attorney, Agent, or Firm*—Woodford R. Thompson, Jr.

[57] ABSTRACT

A dip net assembly for catching fish and the like embodying a loop-like member carried by a handle. The open end of a net member is secured to the loop-like member with the other end of the net member being closed. A U-shaped member extends laterally from the loop-like member and is detachably connected thereto at the free ends of the legs of the U-shaped member with the base of the U-shaped member engaging the closed end of the net member.

1 Claim, 6 Drawing Figures

DIP NET FOR FISH AND THE LIKE

BACKGROUND OF THE INVENTION

This invention relates to a dip net and more particularly to such a net which is especially adapted for catching fish swimming upstream against the flow of water and which permits the net to be stored and shipped in knock-down form whereby the net is assembled and disassembled at the point of use.

Heretofore in the art to which my invention relates, difficulties have been encountered in catching fish swimming upstream with a conventional dip net due to the fact that the net is usually placed in the water at a point upstream of the fish and moved downstream opposite the direction of movement of the fish. Accordingly, it is difficult to maintain the net in an extended position due to the fact that the net will not withstand the force exerted by the flow of water therethrough and will therefore collapse.

BRIEF SUMMARY OF THE INVENTION

In accordance with my invention, I prevent collapse of the net by providing a generally U-shaped member having a base portion adapted to engage the closed end of the net and having legs extending from the base portion toward the open end of the net. The open end of the net is secured to a net carrying member which includes a loop-like member carried by one end of an elongated handle. The free ends of the U-shaped member are detachably connected to the net carrying member whereby the net is retained in an extended lateral position relative to the loop-like member while the net is in the operative position. On the other hand, for shipping and storage, the U-shaped member is removed from the net carrying member whereby the dip net requires a minimum of space for shipment and storage.

DESCRIPTION OF THE DRAWINGS

A dip net embodying features of my invention is illustrated in the accompanying drawings, forming a part of this application in which.

DETAILED DESCRIPTION

Figure 1:
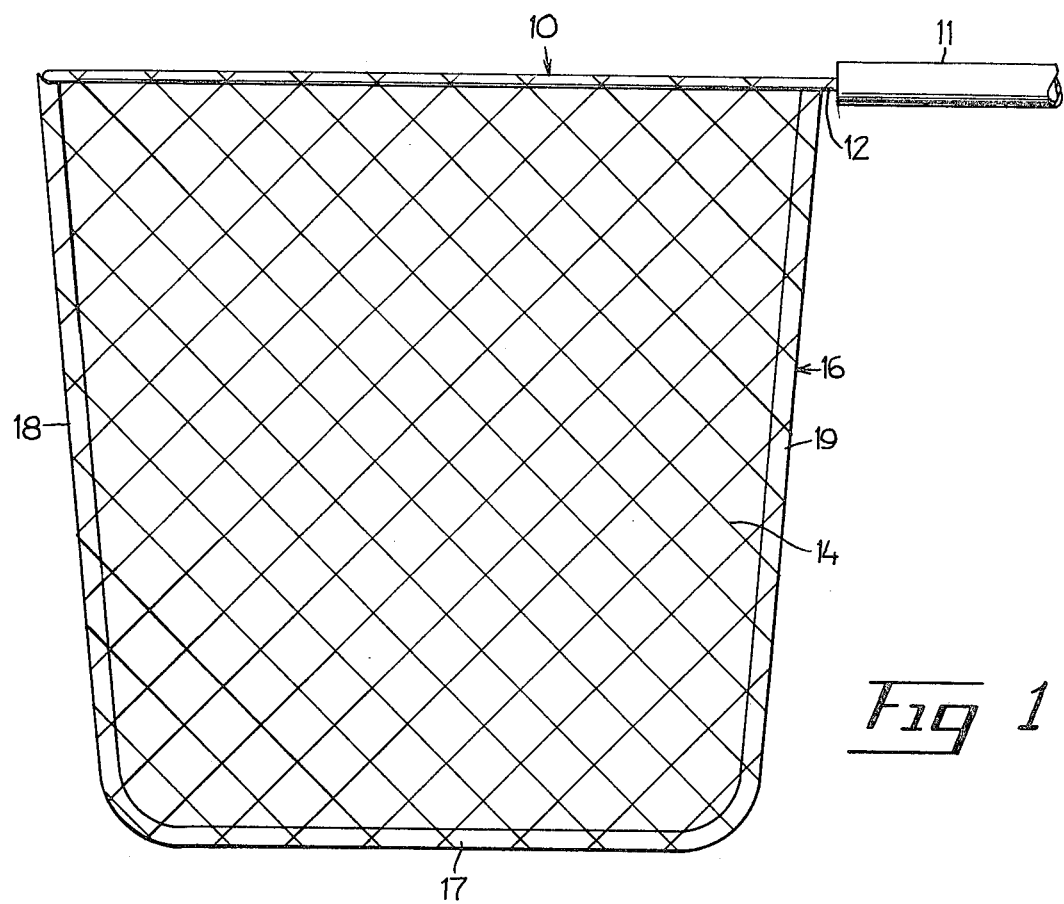
FIG. 1 is a side elevational view, partly broken away, showing the dip net in the operative position.
Figure 2:
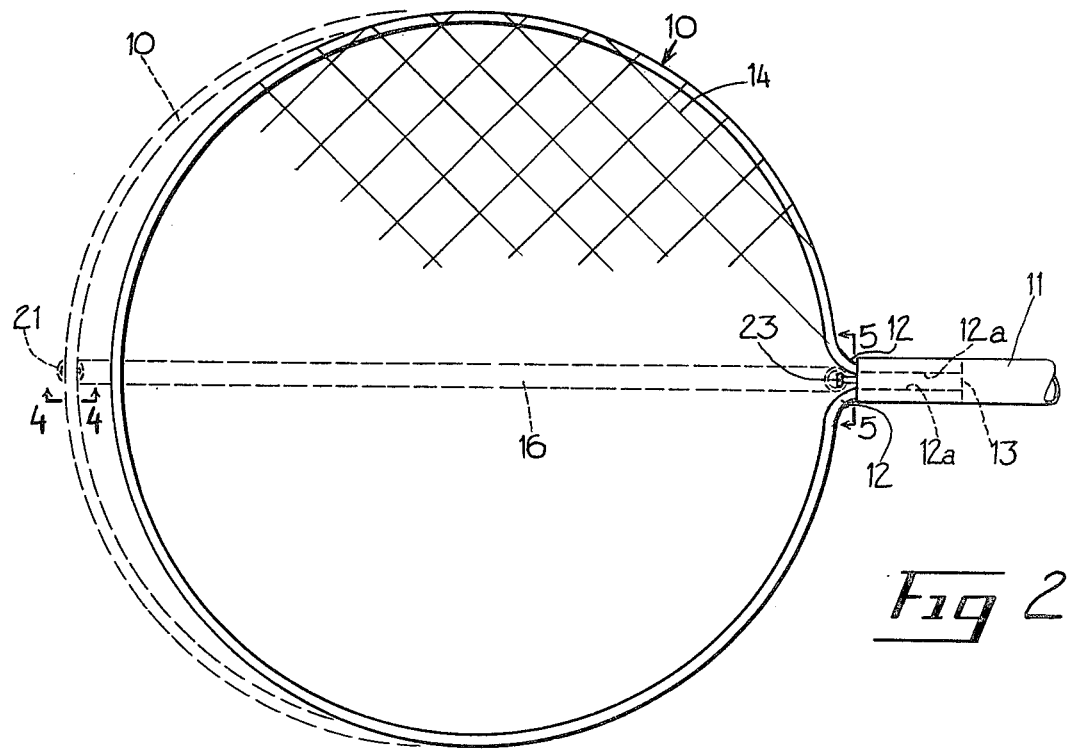
FIG. 2 is a top plan of the dip net shown in FIG. 1 with the U-shaped member being omitted in the solid line position and being assembled relative to the net carrying member in the dotted line positions.
Figure 3:
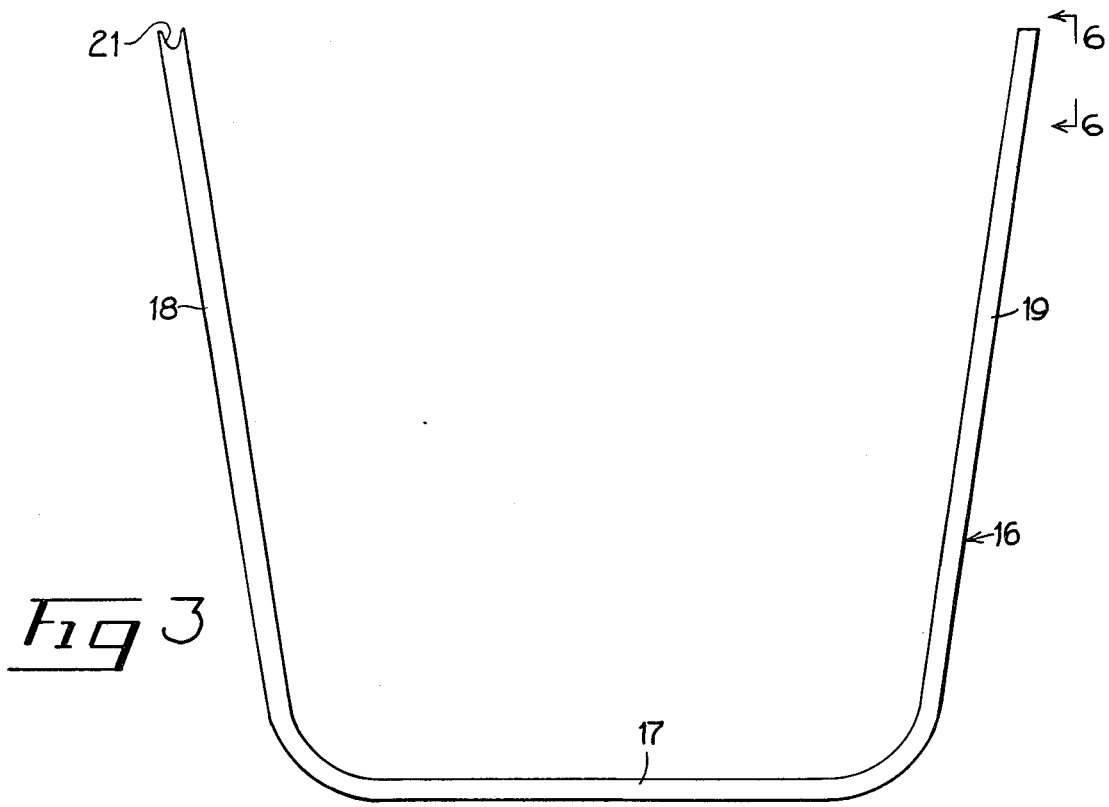
FIG. 3 is a side elevational view showing the generally U-shaped member removed from the net carrying member.

Referring now to the drawings for a better understanding of my invention, I show a net carrying member which embodies a loop-like member 10 which is carried by one end of an elongated handle 11. As shown in FIG. 2, the loop-like member 10 is formed of a continuous length of material, such as metal, with the ends 12 thereof extending inwardly of the adjacent end of the handle 11. Preferably, the portion of the handle connected to the loop-like member 10 is in the form of a tubular member having a plug 13 inserted into the end thereof which receives the free ends 12 of the loop-like member 10. Suitable axially extending recesses $12^a$ are provided in the plug 13 for receiving the free ends 12 of the loop-like member whereby the loop-like member 10 is firmly secured to the handle 11. The plug 13 may be formed of any suitable material, such as plastic and the like. As shown in FIGS. 1 and 2, the open end of an open-ended net 14 is secured to the loop-like member 10 with the other end of the net 14 being closed and projecting laterally from the loop-like member.

To retain the flexible net member in an extended position while in use, I provide a generally U-shaped member 16 having a base portion 17 which is adapted to engage the closed end of the net material 14. Formed integrally with the portion 17 are leg members 18 and 19 which terminate in free ends which are spaced from each other a greater distance than the length of the base portion 17. The U-shaped member 16 is formed of a suitable material, such as metal, whereby the free ends thereof may be moved or sprung inwardly for insertion into the net member 14. After insertion of the U-shaped member 16, the free ends of the legs 18 and 19 tend to move outwardly away from each other to thus exert pressure on opposite sides of the net member 14 whereby it is maintained in the shape shown in FIG. 1 and in dotted lines in FIG. 2.

Figure 4:
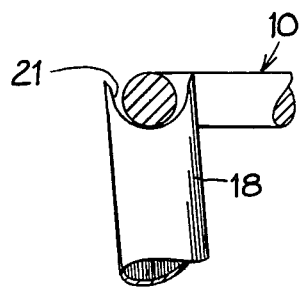
FIG. 4 is an enlarged, fragmental, sectional view taken generally along the line 4—4 of FIG. 2.
Figure 5:
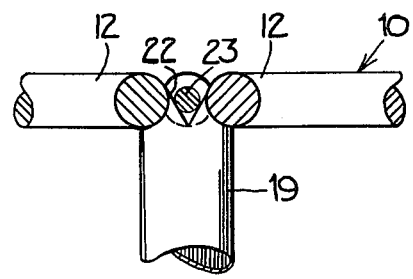
FIG. 5 is an enlarged, fragmental, sectional view taken generally along the line 5—5 of FIG. 2; and, FIG. 6 is a fragmental view taken generally along the line 6—6 of FIG. 3.
Figure 6:

The free end of the leg 18 is provided with a generally U-shaped recess or notch 21 which is adapted to receive a portion of the loop-like member 10 which is located opposite the handle 11, as shown in FIGS. 1, 2 and 4. Notch 21 has its axis extending generally transversely to the longitudinal extent of member 16. A recess or notch 22, having an axis extending generally parallel to the longitudinal extent of member 16, is provided in the free end of the leg 19, as shown in FIG. 6 in position to receive an outwardly projecting pinlike member 23, which may be in the form of a screw or the like. The pin-like member 23 is secured to the plug 13 between the free ends 12 of the loop-like member 10, as clearly shown in FIG. 2, whereby the pin-like member 23 not only engages the U-shaped notch 22 but also prevents lateral movement of the free end of the leg 19 relative to the loop-like member 10. Accordingly, the U-shaped member 16 is secured in the position shown in FIGS. 2 and 5.

From the foregoing description, the operation of my improved dip net will be readily understood. When not in use, such as during shipment or storage, the U-shaped member 16 is removed from the net carrying member whereby the net member 14 is free to collapse and move alongside the loop-like member 10. To assemble the dip net for use, the U-shaped member 16 is inserted into the loop-like member 10 with the base 17 of the U-shaped member 16 engaging the closed end of the net, as shown in FIG. 1. As the U-shaped member 16 is moved inwardly of the net, the free ends of the member 16 are sprung inwardly toward each other whereby the notch 21 receives the adjacent portion of the loop-like member 10 opposite the handle 11 and the notch 22 receives the pin-like member 23. Upon release of the U-shaped member 16, the loop-like member 10 moves from the solid line position shown in FIG. 2 to the dotted line position whereby pressure is exerted to maintain the net material in a tight condition and at the same time form a firm contact between the U-shaped member 16 and the net carrying member. That is, the outward spring action of the U-shaped member 16 causes the notch 21 in the free end of leg 18 to firmly engage the adjacent portion of the loop-like member 10 and at the same time the notch 22 firmly engages the pin-like member 23 to secure the free end of the leg 19 to the net carrying member and limit lateral movement of the U-shaped member 16 relative to the net carrying member.

From the foregoing, it will be seen that I have devised an improved dip net for catching fish. By providing means for maintaining the net member 14 in an extended position at all times, the net is particularly adapted for catching fish, such as shad, as they move upstream. That is, the net member 14 does not move to a collapsed position as the stream of water flows therethrough. Furthermove, by providing the U-shaped member 16 which is detachably connected to the net carrying member, the dip net may be easily and quickly assembled and disassembled.

While I have shown my invention in but one form, it will be obvious to those skilled in the art that it is not so limited but is susceptible of various changes and modifications without departing from the spirit thereof.

What I claim is:

1. A dip net comprising:
    (a) a net carrying member embodying a loop-like member carried by one end of an elongated handle,
    (b) an open-ended net having its open end secured to said loop-like member with the other end being closed and projecting laterally therefrom,
    (c) a generally U-shaped member having a base portion engaging said closed end of said net and having legs extending from said base portion toward said loop-like member and terminating in free ends,
    (d) a first generally U-shaped notch in one said free end of said U-shaped member in position to receive a portion of said loop-like member opposite the handle, said first notch having an axis extending transversely to the longitudinal extent of said U-shaped member,
    (e) a second generally U-shaped notch in the other free end of said U-shaped member, said second notch having an axis extending parallel to the longitudinal extent of said U-shaped member, and
    (f) a pin-like member carried by the end of said handle adjacent said loop-like member in position to engage said second U-shaped notch in said other free end of said U-shaped member.

* * * * *